US010153846B2

(12) United States Patent
Miki

(10) Patent No.: US 10,153,846 B2
(45) Date of Patent: Dec. 11, 2018

(54) OPTICAL COMMUNICATION MODULE, PARALLEL PROCESSING APPARATUS, AND ADJUSTING METHOD

(71) Applicant: FUJITSU LIMITED, Kawasaki-shi, Kanagawa (JP)

(72) Inventor: Atsushi Miki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/606,195

(22) Filed: May 26, 2017

(65) Prior Publication Data

US 2017/0373760 A1 Dec. 28, 2017

(30) Foreign Application Priority Data

Jun. 22, 2016 (JP) .................................. 2016-123865

(51) Int. Cl.
| | | |
|---|---|---|
| *G02B 6/43* | (2006.01) | |
| *G02F 1/01* | (2006.01) | |
| *H04B 10/40* | (2013.01) | |
| *H04B 10/50* | (2013.01) | |
| *H04B 10/548* | (2013.01) | |
| *H04B 10/564* | (2013.01) | |

(52) U.S. Cl.
CPC ........... *H04B 10/5057* (2013.01); *G02B 6/43* (2013.01); *G02F 1/01* (2013.01); *H04B 10/40* (2013.01); *H04B 10/548* (2013.01); *H04B 10/564* (2013.01)

(58) Field of Classification Search
None
See application file for complete search history.

(56) References Cited

U.S. PATENT DOCUMENTS

| 8,873,966 B1 * | 10/2014 | Wach | ..................... | H04B 10/40 398/138 |
| 2007/0269217 A1 * | 11/2007 | Yu | .......................... | H04B 10/40 398/137 |

FOREIGN PATENT DOCUMENTS

| JP | 8-274719 | 10/1996 |
| JP | 2014-78937 | 5/2014 |

* cited by examiner

*Primary Examiner* — Darren E Wolf
(74) *Attorney, Agent, or Firm* — Staas & Halsey LLP

(57) ABSTRACT

An optical-communication module includes a transceiver to communicate with another optical-communication module (another module); and a control circuit to transmit a first signal to the another module at activation of the own module, execute a first control where a second signal transmitted to the first signal is received from the another module, and execute a second control after the first control, wherein one of the first and second control is a control to adjust an intensity of a signal from the transceiver to the another module based on a feedback signal from the another module to a signal from the transceiver, and wherein the other one of the first and second control is a control causing the another module to adjust a signal intensity from the another module to the transceiver by transmitting a feedback signal to the another module to a signal from the another module.

5 Claims, 13 Drawing Sheets

OPTICAL COMMUNICATION MODULE, PARALLEL PROCESSING APPARATUS, AND ADJUSTING METHOD

CROSS-REFERENCE TO RELATED APPLICATION

This application is based upon and claims the benefit of priority of the prior Japanese Patent Application No. 2016-123865, filed on Jun. 22, 2016, the entire contents of which are incorporated herein by reference.

FIELD

The embodiment discussed herein is related to an optical communication module, a parallel processing apparatus, and an adjusting method.

BACKGROUND

In the related art, optical transmission is used for communication between arithmetic circuits in a large-scale parallel processing apparatus such as a super computer. Further, in optical transmission, a technique for adjusting the light output intensity of the optical module is known (for example, see Japanese Laid-open Patent Publication No. 2014-78937 and Japanese Laid-open Patent Publication No. 8-274719). The adjustment of such a light output intensity is called, for example, calibration.

However, in the related art described above, there is a problem that calibration of an optical communication module may not be performed autonomously to each other between optical communication modules. Accordingly, in the related art, for example, the calibration of each optical communication module is performed by using a management device capable of controlling each optical communication module.

Therefore, as the number of optical communication modules increases, the load on the management device increases.

SUMMARY

According to an aspect of the embodiments, an optical communication module includes an optical transceiver configured to communicate with another optical communication module; and a control circuit configured to transmit a first signal to the another optical communication module at a time of activation of the own module, execute a first control in a case where a second signal transmitted in response to the first signal is received from the another optical communication module, and execute a second control after the first control, wherein one of the first control and the second control is a control to adjust a transmission intensity of an optical signal from the optical transceiver to the another optical communication module based on a feedback signal from the another optical communication module in response to an optical signal from the optical transceiver, and wherein the other one of the first control and the second control is a control causing the another optical communication module to adjust a transmission intensity of an optical signal from the another optical communication module to the optical transceiver by transmitting a feedback signal to the another optical communication module in response to an optical signal from the another optical communication module.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of an optical communication module, a parallel processing apparatus, and an adjusting method will be described in detail below with reference to the drawings.

Communication System According to Embodiment

Figure 1:
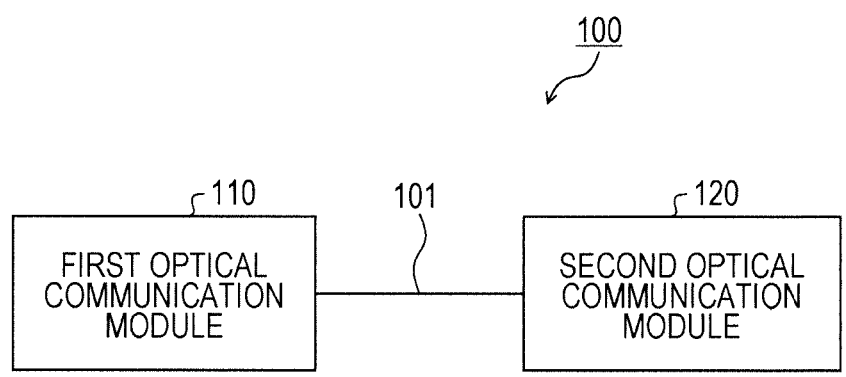
FIG. 1 is a diagram illustrating an example of a communication system according to an embodiment.

FIG. 1 is a diagram illustrating an example of a communication system according to an embodiment. As illustrated in FIG. 1, the communication system 100 according to the embodiment includes a first optical communication module 110 and a second optical communication module 120. The first optical communication module 110 and the second optical communication module 120 are mutually coupled through an optical transmission line 101, and are optical communication modules capable of optical communication with each other through the optical transmission line 101.

The optical transmission line 101 may be an optical waveguide such as an optical fiber or a space for transmitting light. The optical transmission line 101 may include an optical transmission line for transmitting an optical signal from the first optical communication module 110 to the second optical communication module 120, and an optical transmission line for transmitting an optical signal from the second optical communication module 120 to the first optical communication module 110. The first optical communication module 110 and the second optical communication module 120 may include electric or wireless communication paths capable of transmitting and receiving control signals to and from each other, in addition to the optical transmission line 101. Each of the first optical communication module 110 and the second optical communication module 120 includes an optical transceiver.

Examples of control signals transmitted and received between the first optical communication module 110 and the second optical communication module 120 include an FBR, a CR, a TP, a UR, a DR, and an FCE. FeedBack Request (FBR) is a signal requesting a transition to a feedback mode described later. Calibration Request (CR) is a signal requesting a transition to a calibration mode described later.

Test Pattern (TP) is a test pattern for calibration. Up Request (UR) is a signal requesting an increase in the transmission power (light output intensity) of TP in calibration. Down Request (DR) is a signal requesting a decrease in the transmission power of TP in calibration. Feedback Calibration End (FCE) is a signal requesting the end of a feedback and calibration sequence.

TP is an optical signal transmitted through the optical transmission line 101. The FBR, the CR, the UR, the DR, and the FCE may be optical signals transmitted through the optical transmission line 101, or electric signals or radio signals transmitted through a communication path different from the optical transmission line 101.

The first optical communication module 110 and the second optical communication module 120 are collectively powered up by a remote operation from, for example, a communication device external to the first optical communication module 110 and the second optical communication module 120. In the case where the first optical communication module 110 and the second optical communication module 120 are powered up, a time difference may occur between the activation of the first optical communication module 110 and the activation of the second optical communication module 120.

This is due to a time lag in the power-up of the first optical communication module 110 and the second optical communication module 120, a time lag in the activation processing of the first optical communication module 110 and the second optical communication module 120, or the like. Activation is, for example, a state in which optical communication is enabled.

State Transition of Optical Communication Module According to Embodiment

Figure 2:
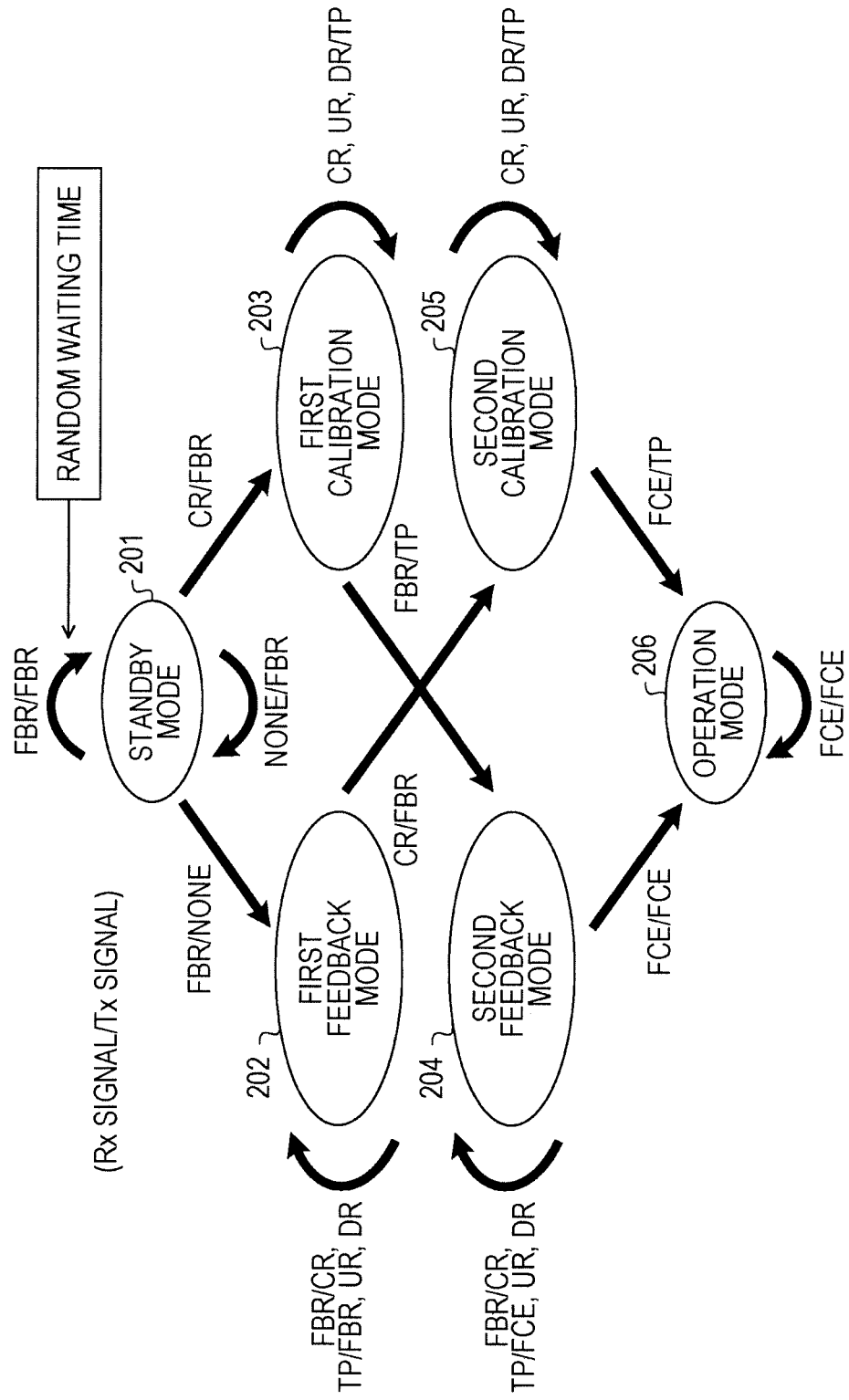
FIG. 2 is a diagram illustrating an example of a state transition of an optical communication module according to the embodiment.

FIG. 2 is a diagram illustrating an example of a state transition of an optical communication module according to the embodiment. Although the state transition of the first optical communication module 110 will be described, the same applies to the state transition of the second optical communication module 120. In FIG. 2, (Rx signal/Tx signal) attached with a thick arrow indicating the state transition indicates that the condition of the state transition is to receive the Rx signal from the opposing module and to transmit the Tx signal to the opposing module.

For example, the first optical communication module 110 enters a standby mode 201 at the time of power-up (for example, immediately after activation) of the own module. The standby mode 201 is a mode to wait for power-up of the opposing module (for example, the second optical communication module 120). In the standby mode 201, the first optical communication module 110 continues to transmit the FBR repeatedly to the opposing module.

In the standby mode 201, in a case of transmitting the FBR to the opposing module without receiving a signal from the opposing module (None/FBR), the first optical communication module 110 maintains the standby mode 201. Thus, in the case where the own module is activated prior to the opposing module, it is possible to wait for activation of the opposing module while repeatedly transmitting the FBR to the opposing module.

In the standby mode 201, in a case of transmitting the FBR to the opposing module and receiving the CR from the opposing module (CR/FBR), the first optical communication module 110 shifts to the first calibration mode 203. Thus, in the case where the own module is activated prior to the opposing module, it is possible to shift to the first calibration mode 203.

In the standby mode 201, in a case of receiving the FBR from the opposing module without transmitting a signal to the opposing module (FBR/none), the first optical communication module 110 shifts to the first feedback mode 202. Thus, when the own module is activated after the opposing module, it is possible to shift to the first feedback mode 202.

In the standby mode 201, in a case of transmitting the FBR to the opposing module and also receiving the FBR from the opposing module (FBR/FBR), the first optical communication module 110 waits for a random waiting time and returns to the standby mode 201. Thus, in the case where the own module and the opposing module are activated at the same time and perform the FBR, the own module and the opposing module respectively wait for the random waiting time and can transmit the FBR.

The first feedback mode 202 is a mode in which a UR or a DR is transmitted to the opposing module depending on the reception level (reception intensity) of the TP received from the opposing module. In the first feedback mode 202, in a case of transmitting the CR to the opposing module and receiving the FBR from the opposing module (FBR/CR), the first optical communication module 110 maintains the first feedback mode 202.

Further, in the first feedback mode 202, in a case of transmitting the FBR, the UR, or the DR to the opposing module, and receiving the TP from the opposing module (TP/FBR, UR, DR), the first optical communication module 110 maintains the first feedback mode 202. Further, in the first feedback mode 202, in a case of transmitting the FBR to the opposing module and receiving the CR from the opposing module (CR/FBR), the first optical communication module 110 shifts to the second calibration mode 205.

The first calibration mode 203 is a mode in which the transmission power of the TP is adjusted according to the UR and DR received from the opposing module while transmitting the TP to the opposing module. In the first calibration mode 203, in a case of transmitting the TP to the opposing module and receiving the CR, the UR or the DR from the opposing module (CR, UR, DR/TP), the first optical communication module 110 maintains the first calibration mode 203.

In the first calibration mode 203, in a case of transmitting the TP to the opposing module and receiving the FBR from the opposing module (FBR/TP), the first optical communication module 110 shifts to the second feedback mode 204.

The second feedback mode 204 is a mode in which the UR or the DR is transmitted to the opposing module depending on the reception level (reception intensity) of the TP received from the opposing module. In the second feedback mode 204, in a case of transmitting the CR to the opposing module and receiving the FBR from the opposing module (FBR/CR), the first optical communication module 110 maintains the second feedback mode 204.

Further, in the second feedback mode 204, in a case of transmitting the FCE, the UR or the DR to the opposing module and receiving the TP from the opposing module (TP/FCE, UR, DR), the first optical communication module 110 maintains the second feedback mode 204. Further, in the second feedback mode 204, in a case of transmitting FCE to the opposing module and receiving FCE from the opposing module (FCE/FCE), the first optical communication module 110 shifts to the operation mode 206.

The second calibration mode 205 is a mode in which the transmission power of the TP is adjusted according to the UR and DR received from the opposing module while transmitting the TP to the opposing module. In the second calibration mode 205, in a case of transmitting the TP to the opposing module and receiving the CR, the UR or the DR from the opposing module (CR, UR, DR/TP), the first optical communication module 110 maintains the second calibration mode 205.

In the second calibration mode 205, in a case of transmitting TP to the opposing module and receiving FCE from the opposing module (FCE/TP), the first optical communication module 110 shifts to the operation mode 206.

The operation mode 206 is a mode for transmitting and receiving user packets to and from the opposing module. In the operation mode 206, in a case of transmitting the FCE to the opposing module and receiving FCE from the opposing module (FCE/FCE), the first optical communication module 110 maintains the operation mode 206.

Figure 3:
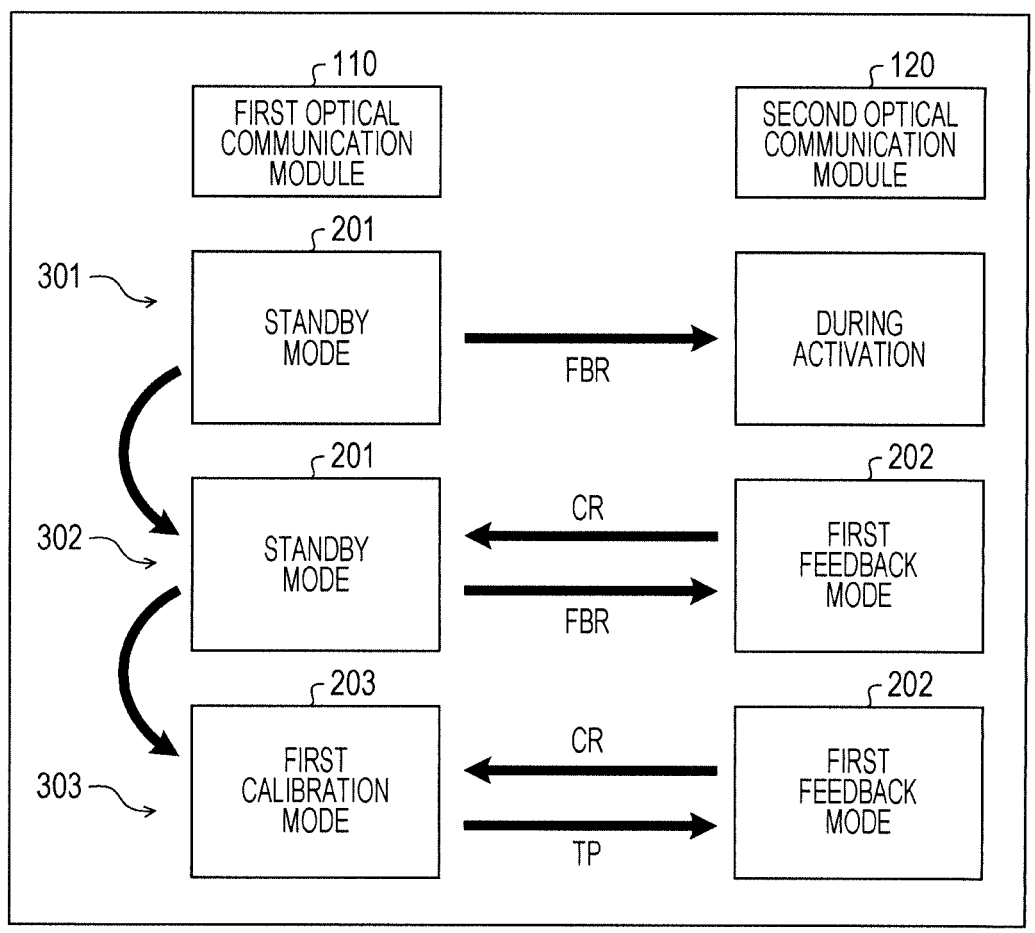
FIG. 3 is a diagram illustrating an example of a state transition immediately after power-up in the communication system according to the embodiment.

State Transition Immediately after Power-Up of Communication System According to Embodiment FIG. 3 is a diagram illustrating an example of a state transition immediately after power-up of the communication system according to the embodiment. Processing by the first optical communication module 110 and the second optical communication module 120 in the case where the first optical communication module 110 is powered up prior to the second optical communication module 120 will be described in FIGS. 3 to 7.

If the first optical communication module 110 is powered up prior to the second optical communication module 120, it enters the state 301 illustrated in FIG. 3. In other words, the first optical communication module 110 shifts to the standby mode 201 when the power supply is activated, and enters a state where the FBR is repeatedly transmitted to the second optical communication module 120. The second optical communication module 120 is in a state of being activated.

Next, if the second optical communication module 120 is turned on, it enters the state 302. In other words, the second optical communication module 120 enters the standby mode 201 by being activated, shifts to the first feedback mode 202 by receiving the FBR transmitted from the first optical communication module 110, and transmits the CR to the first optical communication module 110.

Next, the first optical communication module 110 receives the CR from the second optical communication module 120 so as to enter a state 303. In other words, the second optical communication module 120 shifts to the first calibration mode 203, and starts transmission of the TP to the second optical communication module 120.

Figure 4:
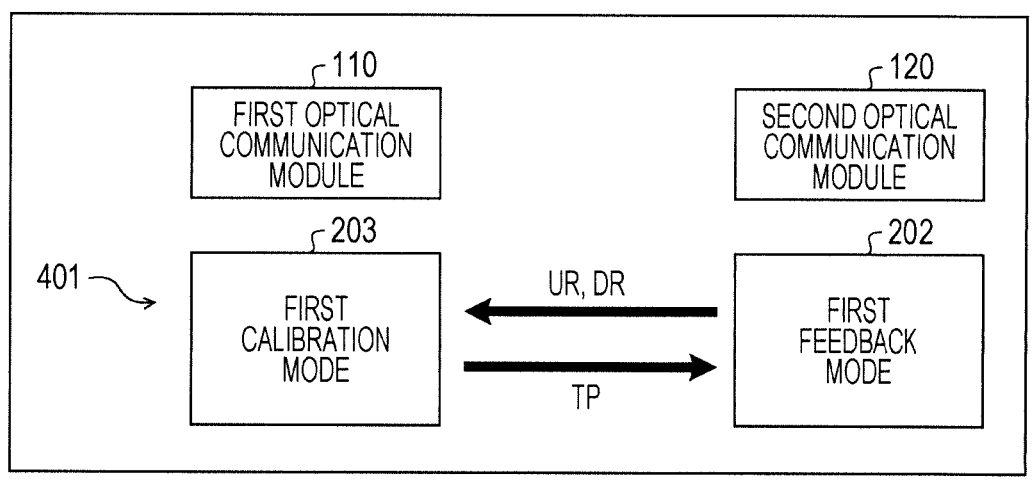
FIG. 4 is a diagram illustrating an example of light intensity adjustment of a first optical communication module in the communication system according to the embodiment.

Light Intensity Adjustment of First Optical Communication Module in Communication System According to Embodiment FIG. 4 is a diagram illustrating an example of light intensity adjustment of the first optical communication module in the communication system according to the embodiment. In the state 303 illustrated in FIG. 3, the second optical communication module 120 receives the TP from the first optical communication module 110 so as to enter the state 401 illustrated in FIG. 4. In other words, the second optical communication module 120 transmits the UR or the DR based on the TP received from the first optical communication module 110, to the first optical communication module 110.

For example, in the case where the reception level (reception power) of the TP transmitted from the first optical communication module 110 in the second optical communication module 120 is higher than an appropriate level, the second optical communication module 120 transmits the DR requesting an increase of the transmission power to the first optical communication module 110. In the case where the reception level of the TP transmitted from the first optical communication module 110 in the second optical communication module 120 is lower than the appropriate level, the second optical communication module 120 transmits the DR requesting an increase of the transmission power to the first optical communication module 110.

The appropriate level is the minimum level at which the communication quality (for example, an error rate) in optical communication becomes equal to or higher than a predetermined quality. Further, the appropriate level may be a predetermined reception level or a reception level of a predetermined range.

Figure 5:
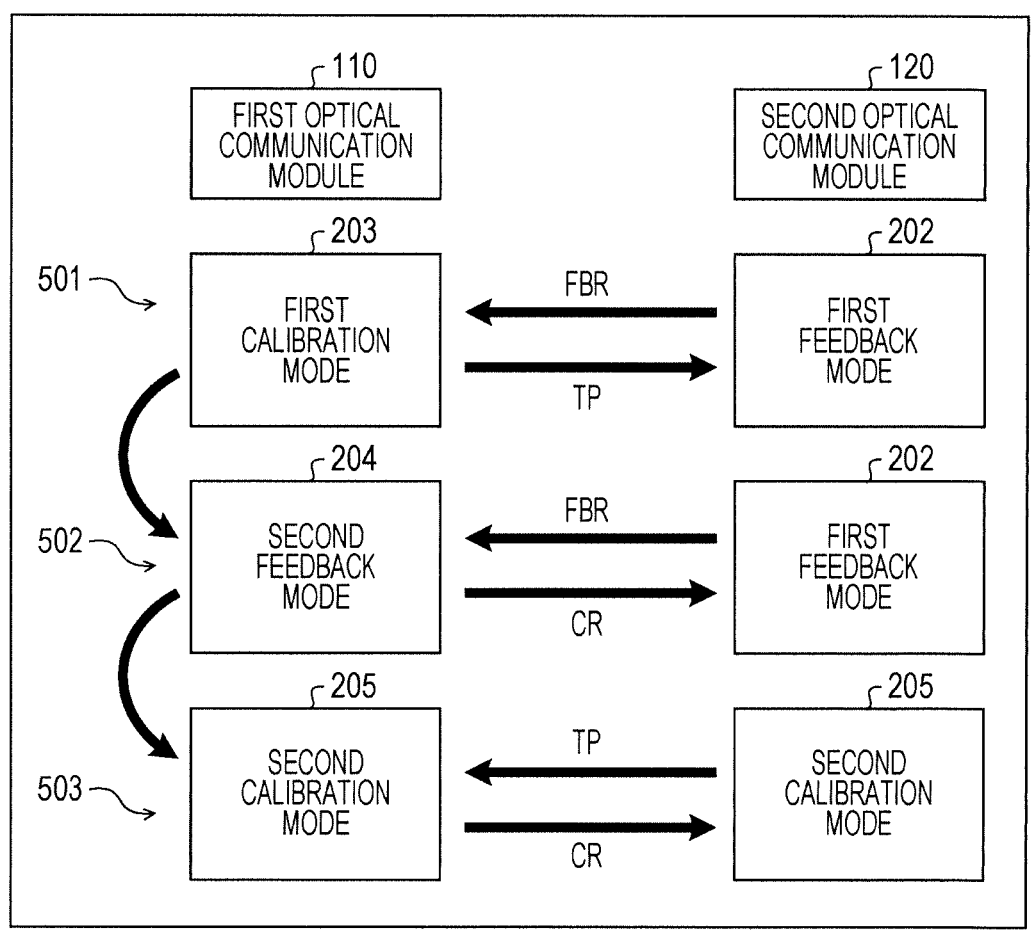
FIG. 5 is a diagram illustrating an example of replacement of a module for adjusting light intensity in the communication system according to the embodiment.

Replacement of Module for Adjusting Light Intensity in Communication System According to Embodiment FIG. 5 is a diagram illustrating an example of replacement of a module for adjusting light intensity in the communication system according to the embodiment. In the state 401 illustrated in FIG. 4, if the reception level of the TP received by the second optical communication module 120 from the first optical communication module 110 is the appropriate level, it becomes the state 501 illustrated in FIG. 5. That is, the second optical communication module 120 transmits the FBR to the first optical communication module 110. The transmission power of the TP by the first optical communication module 110 at this time is set as the transmission power of the optical signal used for transmitting the user packet from the first optical communication module 110 to the second optical communication module 120.

Next, the first optical communication module 110 receives the FBR from the second optical communication module 120 so as to enter the state as the state 502. That is, the first optical communication module 110 shifts to the second feedback mode 204 and transmits the CR to the second optical communication module 120. Next, the second optical communication module 120 receives the CR from the first optical communication module 110 so as to enter the state 503. That is, the second optical communication module 120 shifts to the second calibration mode 205, and starts transmission of the TP to the first optical communication module 110.

Figure 6:
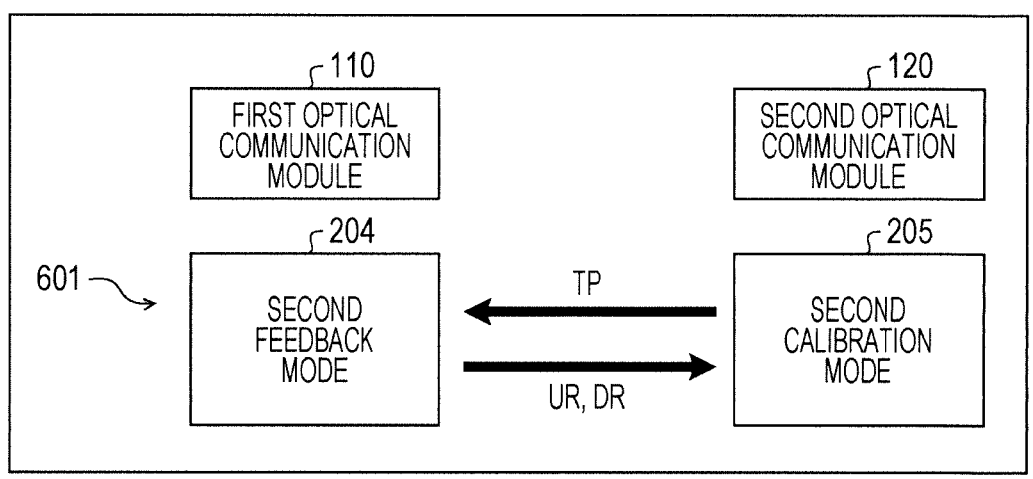
FIG. 6 is a diagram illustrating an example of light intensity adjustment of a second optical communication module in the communication system according to the embodiment.

Light Intensity Adjustment of Second Optical Communication Module in Communication System According to Embodiment FIG. 6 is a diagram illustrating an example of light intensity adjustment of the second optical communication module in the communication system according to the embodiment. In the state 503 illustrated in FIG. 5, the first optical communication module 110 receives the TP from the second optical communication module 120 so as to enter the state 601 as illustrated in FIG. 6. That is, the first optical communication module 110 transmits the UR or the DR based on the TP received from the second optical communication module 120, to the second optical communication module 120.

Transition to Operation Mode in Communication System According to Embodiment

Figure 7:
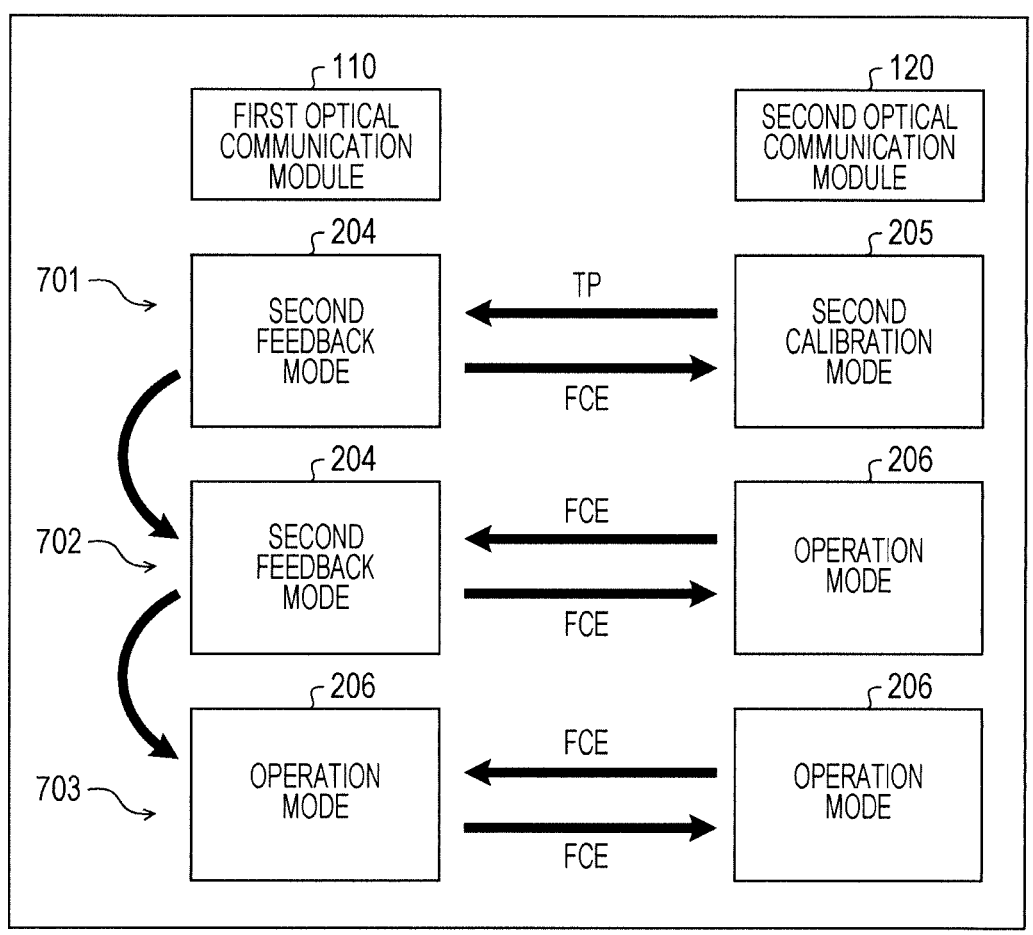
FIG. 7 is a diagram illustrating an example of a transition to an operation mode in the communication system according to the embodiment.

FIG. 7 is a diagram illustrating an example of a transition to an operation mode in the communication system according to the embodiment. In the state 601 illustrated in FIG. 6, if the reception level of the TP received by the first optical communication module 110 from the second optical communication module 120 is the appropriate level, it becomes the state 701 illustrated in FIG. 7. That is, the first optical communication module 110 transmits the FCE to the second optical communication module 120. The transmission power of the TP by the second optical communication module 120 at this time is set as the transmission power of the optical signal used for transmitting the user packet from the second optical communication module 120 to the first optical communication module 110.

Next, the second optical communication module 120 receives the FCE from the first optical communication module 110 so as to enter the state 702. That is, the second optical communication module 120 shifts to the operation mode 206 and transmits the FCE to the first optical communication module 110. Next, the first optical communication module 110 receives the FCE from the second optical communication module 120 so as to enter the state 703. That is, the first optical communication module 110 shifts to the operation mode 206.

Thus, the first optical communication module 110 and the second optical communication module 120 enter the operation mode 206, and the transmission of user packets by optical signals is started between the first optical communication module 110 and the second optical communication module 120 through the optical transmission line 101.

Processing by Optical Communication Module According to Embodiment

Figure 8:
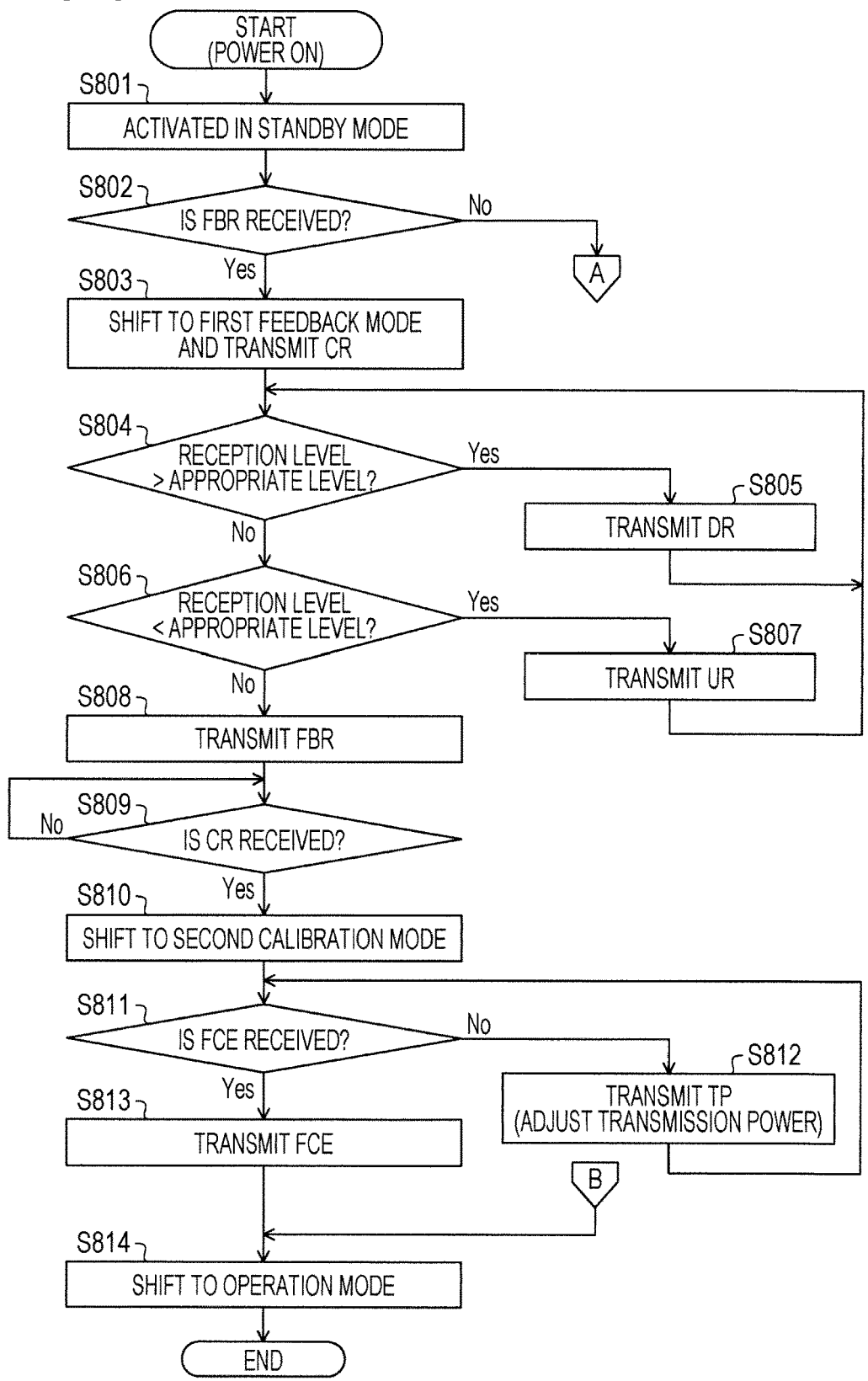
FIG. 8 is a flowchart (Part 1) illustrating an example of processing by the optical communication module according to the embodiment.
Figure 9:
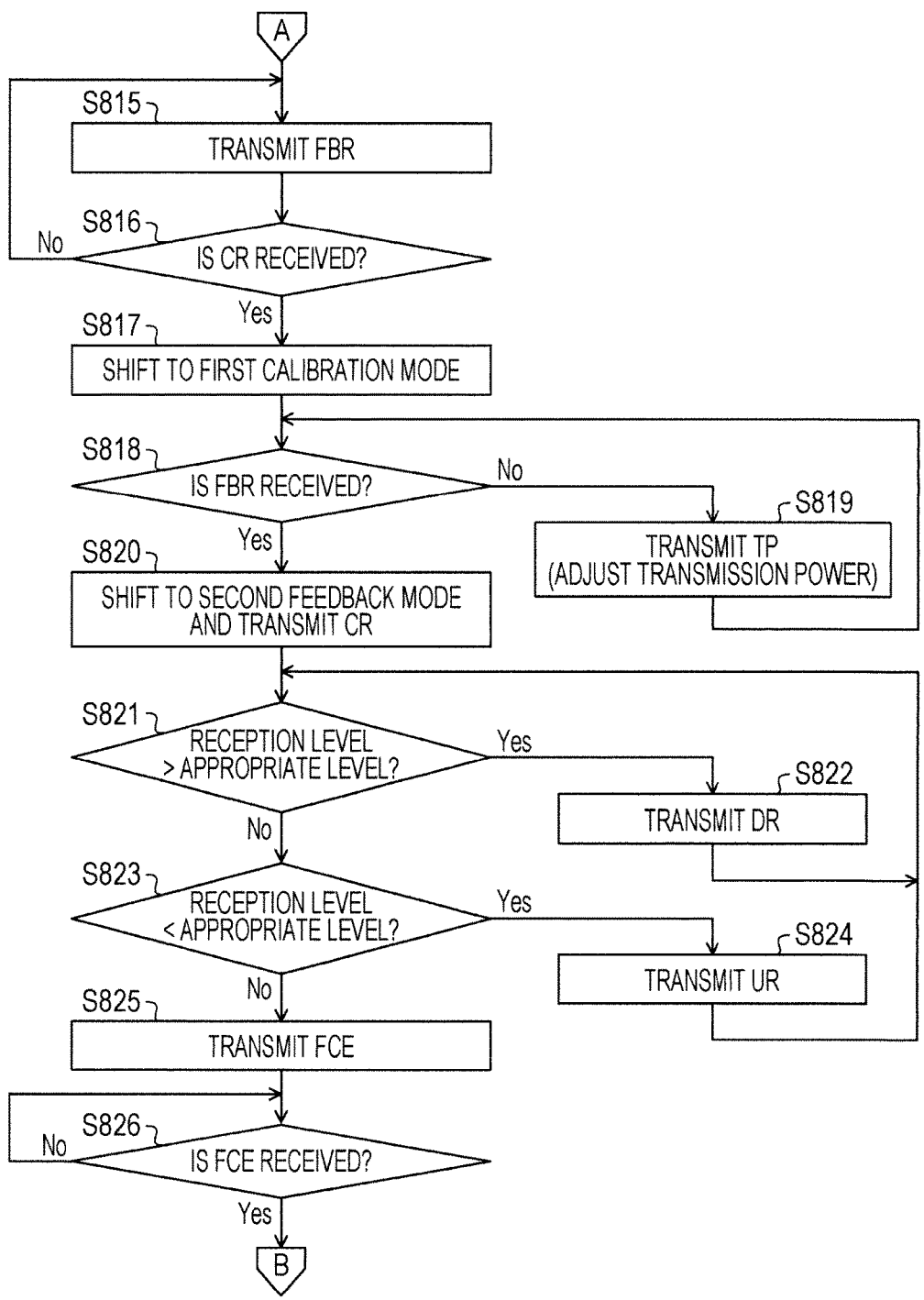
FIG. 9 is a flowchart (Part 2) illustrating an example of processing by the optical communication module according to the embodiment.

FIG. 8 and FIG. 9 are flowcharts illustrating an example of processing by an optical communication module according to the embodiment. The processing by the first optical communication module 110 will be described, but processing by the second optical communication module 120 is similar. The first optical communication module 110 executes respective steps illustrated in FIG. 8 and FIG. 9 by being powered up to the own module. First, the first optical communication module 110 is activated in the standby mode 201 (step S801).

Next, the first optical communication module 110 determines whether or not FBR is received from the opposing module (for example, the second optical communication module 120) (step S802). For example, the first optical communication module 110 determines whether or not the FBR is received within a predetermined period of time after proceeding to step S802. In the case where the FBR is received (step S802: Yes), it can be determined that the opposing module is activated prior to the own module. In this case, the first optical communication module 110 shifts to the first feedback mode 202 and transmits the CR to the opposing module (step S803). Thus, the opposing module shifts to the first calibration mode 203, and the TP is transmitted from the opposing module.

Next, the first optical communication module 110 determines whether or not the reception level in this module of the TP transmitted from the opposing module is higher than an appropriate level (step S804). In the case where the reception level is higher than the appropriate level (step S804: Yes), the first optical communication module 110 transmits the DR to the opposing module (step S805), and returns to step S804. Thus, the transmission power of the TP from the opposing module decreases.

In the case where it is determined in step S804 that the reception level is not higher than the appropriate level (step S804: No), the first optical communication module 110 proceeds to step S806. In other words, the first optical communication module 110 determines whether the reception level in the own module of the TP transmitted from the opposing module is lower than an appropriate level (step S806). In the case where the reception level is lower than the appropriate level (step S806: Yes), the first optical communication module 110 transmits the UR to the opposing module (step S807), and the process returns to step S804. Thus, the transmission power of the TP from the opposing module increases.

In the case where it is determined in step S806 that the reception level is not lower than the appropriate level (step S806: No), it can be determined that the reception level is the appropriate level, that is, the transmission power in the opposing module is appropriate. In this case, the first optical communication module 110 transmits the FBR to the opposing module (step S808). Thus, the opposing module shifts to the second feedback mode 204.

Next, the first optical communication module 110 determines whether or not the CR has been received from the opposing module (step S809), and waits until receiving the CR (step S809: No loop). Upon receipt of the CR (step S809: Yes), the first optical communication module 110 shifts to the second calibration mode 205 (step S810).

Next, the first optical communication module 110 determines whether or not the FCE is received from the opposing module (step S811). In the case where the FCE is not received (step S811: No), the first optical communication module 110 transmits the TP to the opposing module (step S812), and the process returns to step S811. In step S812, the first optical communication module 110 adjusts the transmission power (transmission intensity) of the TP to the opposing module, based on the DR or the UR transmitted from the opposing module.

In the case where the FCE is received (step S811: Yes), it can be determined that the transmission power of the TP to the opposing module has become appropriate. In this case, the first optical communication module 110 transmits the FCE to the opposing module (step S813). Thus, the opposing module shifts to the operation mode 206.

Next, the first optical communication module 110 shifts to the operation mode 206 (step S814), and ends the series of processing. Thus, the first optical communication module 110 starts transmitting and receiving a user packet to and from the opposing module. In addition, the first optical communication module 110 transmits the user packet according to the transmission power of the TP to the opposing module at the time of receiving the FCE in step S811, in the started transmitting and receiving the user packet.

In the case where it is determined in step S802 that the FBR is not received (step S802: No), it can be determined that the own module is activated prior to the opposing module. In this case, the first optical communication module 110 transmits the FBR to the opposing module (step S815).

Next, the first optical communication module 110 determines whether or not the CR is received from the opposing module (step S816). In the case where the CR is not received (step S816: No loop), it can be determined that the opposing module is not activated yet. In this case, the first optical communication module 110 returns to step S815. In the case where the CR is received (step S816: Yes), it can be determined that the opposing module is activated. In this case, the first optical communication module 110 shifts to the first calibration mode 203 (step S817).

Next, the first optical communication module 110 determines whether or not the FBR is received from the opposing module (step S818). In the case where the FBR is not received (step S818: No), the first optical communication module 110 transmits the TP to the opposing module (step S819), and the process returns to step S818. In step S819, the first optical communication module 110 adjusts the transmission power of the TP to the opposing module, based on the DR or the UR transmitted from the opposing module.

In the case where it is determined in step S818 that the FBR is received (step S818: Yes), it can be determined that the transmission power of the TP to the opposing module has become appropriate. In this case, the first optical communication module 110 shifts to the second feedback mode 204 and transmits the CR to the opposing module (step S820). Thus, the opposing module shifts to the second calibration mode 205, and the TP is transmitted from the opposing module.

Next, the first optical communication module 110 determines whether or not the reception level in this module of the TP transmitted from the opposing module is higher than an appropriate level (step S821). In the case where the reception level is higher than the appropriate level (step S821: Yes), the first optical communication module 110 transmits the DR to the opposing module (step S822), and the process returns to step S821. Thus, the transmission power of the TP from the opposing module decreases.

In the case where it is determined in step S821 that the reception level is not higher than the appropriate level (step S821: No), the first optical communication module 110 proceeds to step S823. In other words, the first optical communication module 110 determines whether or not the reception level in this module of the TP transmitted from the opposing module is lower than an appropriate level (step S823). In the case where the reception level is lower than the appropriate level (step S823: Yes), the first optical communication module 110 transmits the UR to the opposing module (step S824), and the process returns to step S821. Thus, the transmission power of the TP from the opposing module increases.

In the case where it is determined in step S823 that the reception level is not lower than the appropriate level (step S823: No), it can be determined that the reception level is the appropriate level, that is, the transmission power in the opposing module is appropriate. In this case, the first optical communication module 110 transmits the FCE to the opposing module (step S825). Thus, the opposing module shifts to the operation mode 206.

Next, the first optical communication module 110 determines whether or not the FCE is received from the opposing module (step S826), and waits until receiving the FCE (step S826: No loop). Upon receiving the FCE (step S826: Yes), the first optical communication module 110 proceeds to step S814 and shifts to the operation mode 206 to end the series of processing. Thus, the first optical communication module 110 starts transmitting and receiving a user packet to and from the opposing module. In addition, the first optical communication module 110 transmits the user packet according to the transmission power of the TP to the opposing module at the time of receiving the FCE in step S826, in the started transmission and reception of the user packet.

In addition, In the case where the FBR is transmitted to the opposing module and the FBR is received from the opposing module in step S816, the first optical communication module 110 may wait for a random waiting time and then return to step S802. Thus, In the case where the own module and the opposing module are activated at the same time, it is possible to avoid shifting of the own module and the opposing module to the first feedback mode 202 and failing in the calibration.

Optical Communication Module According to Embodiment

Figure 10:
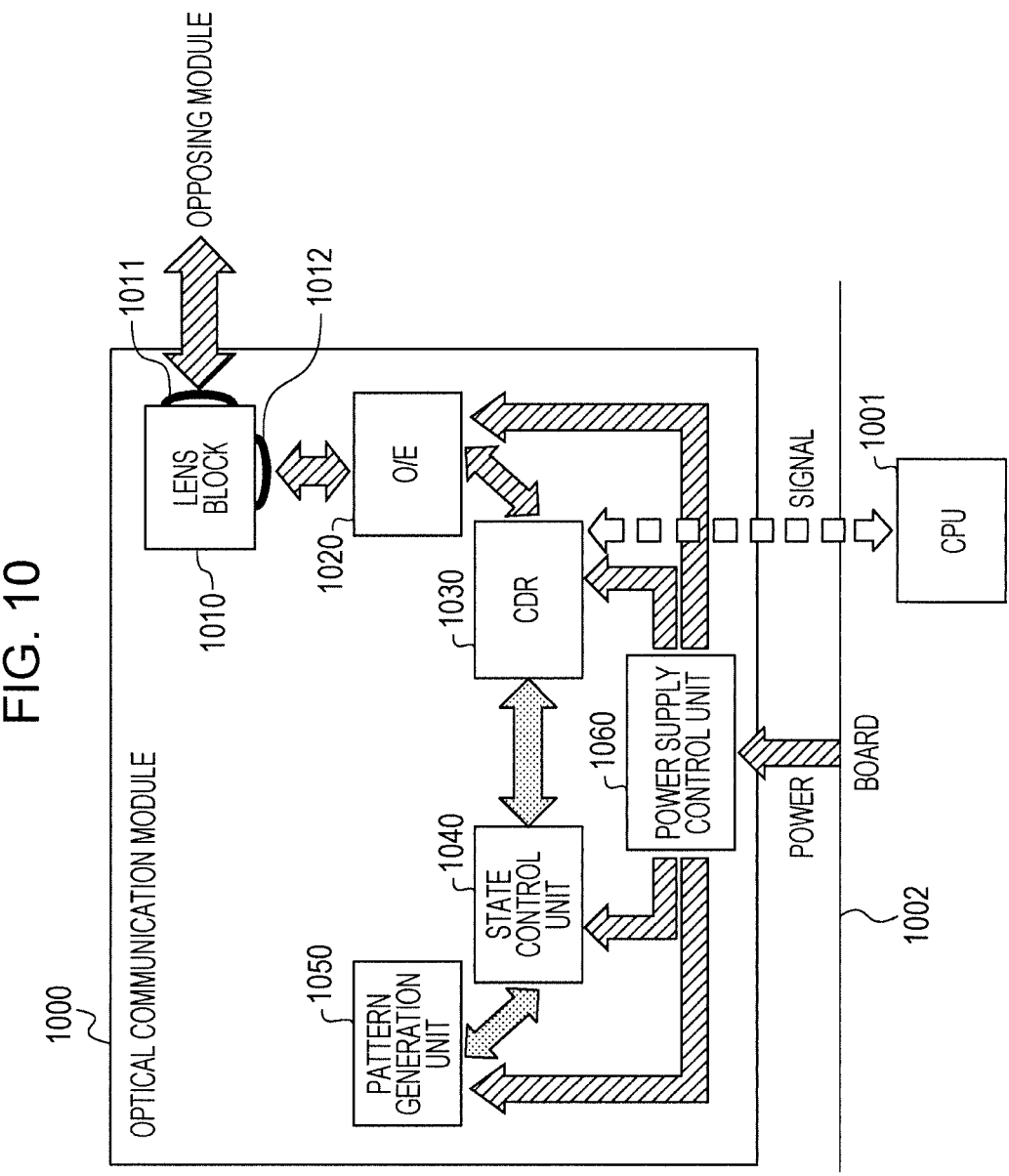
FIG. 10 is a diagram illustrating an example of the optical communication module according to the embodiment.

FIG. 10 is a diagram illustrating an example of an optical communication module according to the embodiment. Each of the first optical communication module 110 and the second optical communication module 120 can be realized by, for example, the optical communication module 1000 illustrated in FIG. 10. As illustrated in FIG. 10, the optical communication module 1000 is provided on a board 1002 together with a CPU 1001, and performs optical communication with the opposing module according to the control of the CPU 1001. The CPU is an abbreviation for a Central Processing Unit.

Further, the optical communication module 1000 includes, for example, a lens block 1010, an electro-optical conversion unit 1020 (O/E), a CDR 1030, a pattern generation unit 1050, a state control unit 1040, and a power control unit 1060. CDR stands for Clock Data Recovery.

The lens block 1010 includes condenser lenses 1011 and 1012. An optical signal transmitted from the coupled opposing module through the optical transmission line 101 is incident on the lens block 1010 through the condenser lens 1011. Then, the lens block 1010 emits the optical signal incident through the condenser lens 1011 to the electro-optical conversion unit 1020 through the condenser lens 1012.

Further, an optical signal emitted from the electro-optical conversion unit 1020 is incident to the lens block 1010 through the condenser lens 1012. Then, the lens block 1010 transmits the optical signal incident through the condenser lens 1012 to the opposing module through the condenser lens 1011 and the optical transmission line 101.

The electro-optical conversion unit 1020 includes photo detector (PD) configured to receive the optical signal emitted from the lens block 1010 and convert the received optical signal into an electric signal. Then, the electro-optical conversion unit 1020 outputs the converted electric signal to the CDR 1030. Further, the electro-optical conversion unit 1020 includes a laser diode (LD) configured to convert the electric signal output from the CDR 1030 into an optical signal. Then, the electro-optical conversion unit 1020 outputs the converted optical signal to the lens block 1010.

The CDR 1030 performs a clock data recovery process on the receiving side of the electric signal output from the electro-optical conversion unit 1020. The clock data recovery process includes, for example, a process of extracting a clock from an input signal and shaping the signal. Then, the CDR 1030 outputs to the state control unit 1040, a signal obtained by the clock data recovery process on the receiving side during the calibration. Further, the CDR 1030 outputs to the CPU 1001 a user packet obtained by the clock data recovery process on the receiving side during the operation.

During the calibration, the signal output from the state control unit 1040 is input to the CDR 1030. Further, the user packet output from the CPU 1001 is input to the CDR 1030 during the operation after the calibration. The CDR 1030 performs a clock data recovery process on the transmission side with respect to the signal input from the state control unit 1040 or the CPU 1001, and outputs the electric signal obtained by the clock data recovery process on the transmission side to the electro-optical conversion unit 1020.

The state control unit 1040 is a control circuit configured to control switching between the standby mode 201, the first feedback mode 202, the first calibration mode 203, the second feedback mode 204, and the operation mode 206 which are described above. The control circuit may include a programmable logic device such as a field-programmable gate array (FPGA) and/or a DSP (digital signal processor).

For example, each step illustrated in FIG. 8 and FIG. 9 is executed under the control of the state control unit 1040.

For example, the state control unit 1040 outputs signals for calibration to the CDR 1030 to transmit the signal to the opposing module, and obtains the signals for calibration transmitted from the opposing module from the CDR 1030, thereby controlling the calibration. The signals for calibration include the above-mentioned FBR, CR, TP, UR, DR, FCE, and the like. Of these signals for the calibration, the state control unit 1040 controls the pattern generation unit 1050 so as to output the TP from the pattern generation unit 1050, and outputs the TP output from the pattern generation unit 1050 to the CDR 1030.

The pattern generation unit 1050 generates a TP of a predetermined pattern under the control of the state control unit 1040, and outputs the TP to the state control unit 1040. TP is, for example, a known signal in the own module and the opposing module. For example, the state control unit 1040 and the pattern generation unit 1050 can be realized by digital circuits such as a field programmable gate array (FPGA) and a digital signal processor (DSP).

The power control unit 1060 is a driver configured to supply driving power to the electro-optical conversion unit 1020, the CDR 1030, the state control unit 1040, and the pattern generation unit 1050 by using the power supplied from the board 1002.

The optical communication unit capable of optical communication with another optical communication module can be realized by, for example, the lens block 1010, the electro-optical conversion unit 1020, and the CDR 1030. The control unit configured to execute a first control and a second control with another optical communication module can be realized by, for example, the state control unit 1040 and the pattern generation unit 1050.

Parallel Processing Apparatus According to Embodiment

Figure 11:
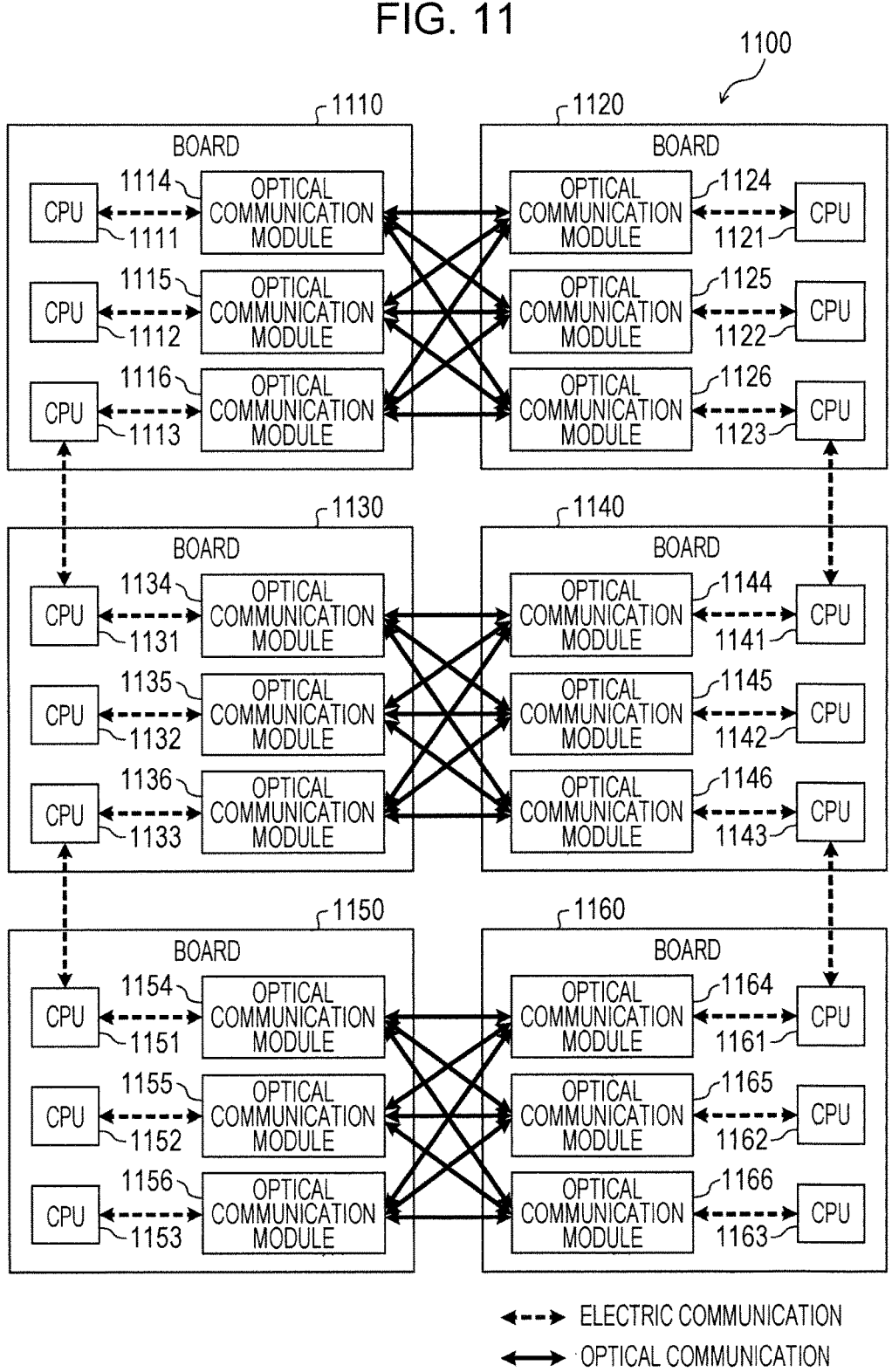
FIG. 11 is a diagram illustrating an example of a parallel processing apparatus according to the embodiment.

FIG. 11 is a diagram illustrating an example of a parallel processing apparatus according to an embodiment. As illustrated in FIG. 11, the parallel processing apparatus 1100 according to the embodiment includes, for example, boards 1110, 1120, 1130, 1140, 1150, and 1160.

The board 1110 includes CPUs 1111 to 1113 and optical communication modules 1114 to 1116. The CPUs 1111 to 1113 respectively control the optical communication modules 1114 to 1116 to perform optical communication with the board 1120. Further, the CPU 1113 is coupled to the CPU 1131 of the board 1130 so as to perform electric communication with the CPU 1131.

The board 1120 includes CPUs 1121 to 1123 and optical communication modules 1124 to 1126. The CPUs 1121 to 1123 respectively control the optical communication modules 1124 to 1126 so as to perform optical communication with the board 1110. Further, the CPU 1123 is coupled to the CPU 1141 of the board 1140, and performs electric communication with the CPU 1141.

The board 1130 includes CPUs 1131 to 1133 and optical communication modules 1134 to 1136. The CPUs 1131 to 1133 respectively control the optical communication modules 1134 to 1136 so as to perform optical communication with the board 1140. Further, the CPU 1133 is coupled to the CPU 1151 of the board 1150, and performs electric communication with the CPU 1151.

The board 1140 includes CPUs 1141 to 1143 and optical communication modules 1144 to 1146. The CPUs 1141 to 1143 respectively control the optical communication modules 1144 to 1146 so as to perform optical communication with the board 1130. Further, the CPU 1143 is coupled to the CPU 1161 of the board 1160, and performs electric communication with the CPU 1161.

The board 1150 includes CPUs 1151 to 1153 and optical communication modules 1154 to 1156. The CPUs 1151 to 1153 respectively control the optical communication modules 1154 to 1156 so as to perform optical communication with the board 1160.

The board 1160 includes CPUs 1161 to 1163 and optical communication modules 1164 to 1166. The CPUs 1161 to 1163 respectively control the optical communication modules 1164 to 1166 so as to perform optical communication with the board 1150.

The optical communication modules 1114 to 1116 of the board 1110 and the optical communication modules 1124 to 1126 of the board 1120 can perform optical communication with each other. For example, the optical communication module 1114 is coupled to the optical communication modules 1124 to 1126, respectively. Then, the optical signal emitted from the optical communication module 1114 is branched and incident on the optical communication modules 1124 to 1126, respectively. Further, the respective optical signals emitted from the optical communication modules 1124 to 1126 are multiplexed and incident on the optical communication module 1114.

Similarly, the optical communication modules 1134 to 1136 of the board 1130 and the optical communication modules 1144 to 1146 of the board 1140 can perform optical communication with each other. Similarly, the optical communication modules 1154 to 1156 of the board 1150 and the optical communication modules 1164 to 1166 of the board 1160 can perform optical communication with each other.

In addition, the CPUs 1111 to 1113, 1121 to 1123, 1131 to 1133, 1141 to 1143, 1151 to 1153, and 1161 to 1163 communicate with each other using electric communication and optical communication to perform parallel arithmetic processing in cooperation. By using optical communication for parallel computation processing, the efficiency of large-scale computation can be improved.

However, in the parallel processing apparatus 1100, various configurations can be adopted for the number of boards coupled to each other, the number of CPUs and optical communication modules in the board, and the coupling form of electric communication and optical communication, without being limited to the example illustrated in FIG. 11.

The first optical communication module 110 and the second optical communication module 120 described above can be applied to each optical communication module (the optical communication module 1114 and the optical communication module 1124 as one example) facing each other in the parallel processing apparatus 1100. This makes it possible to autonomously execute the calibration of each optical communication module of the parallel processing apparatus 1100 between the optical communication modules without using a management device that calibrates each optical communication module.

However, the first optical communication module 110 and the second optical communication module 120 are not limited to parallel processing apparatuses such as the parallel processing apparatus 1100, but may be applied to each system that performs optical communication, such as a system that performs optical communication between apparatuses.

Order of Performing Calibration

The configuration in which calibration of the optical communication module which is activated earlier out of the first optical communication module 110 and the second optical communication module 120 is performed and the calibration of the optical communication module that is activated later is performed next has been described, but it is not limited to such a configuration. For example, it may be configured such that calibration of the optical communication module that is activated later out of the first optical communication module 110 and the second optical communication module 120 is performed and the calibration of the optical communication module that is activated earlier is performed. Processing by the first optical communication module 110 and the second optical communication module 120 in such a configuration will be described with reference to FIGS. 12 and 13.

Processing by Optical Communication Module According to Embodiment

Figure 12:
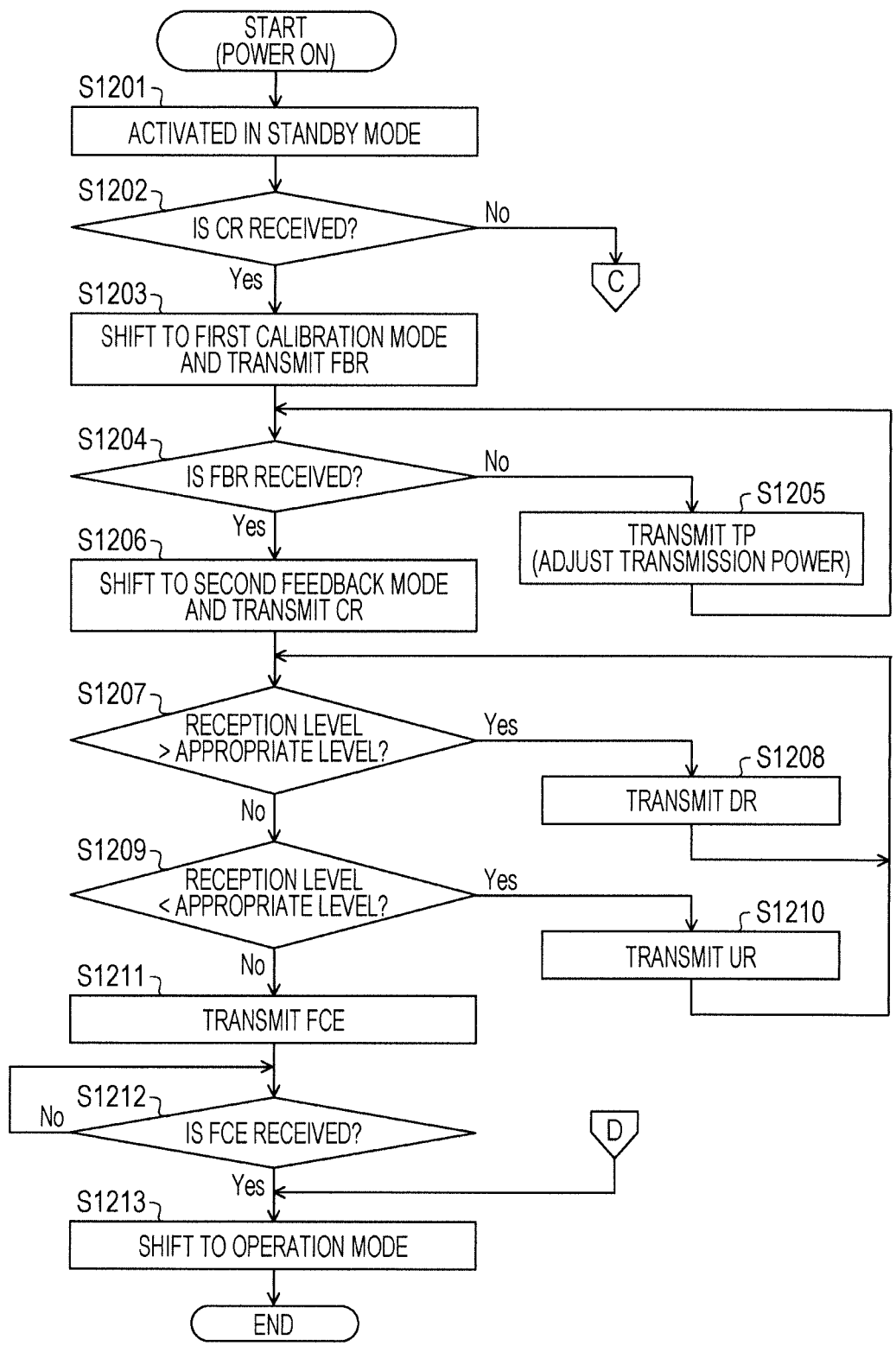
FIG. 12 is a flowchart (Part 1) illustrating another example of processing by the optical communication module according to the embodiment.
Figure 13:
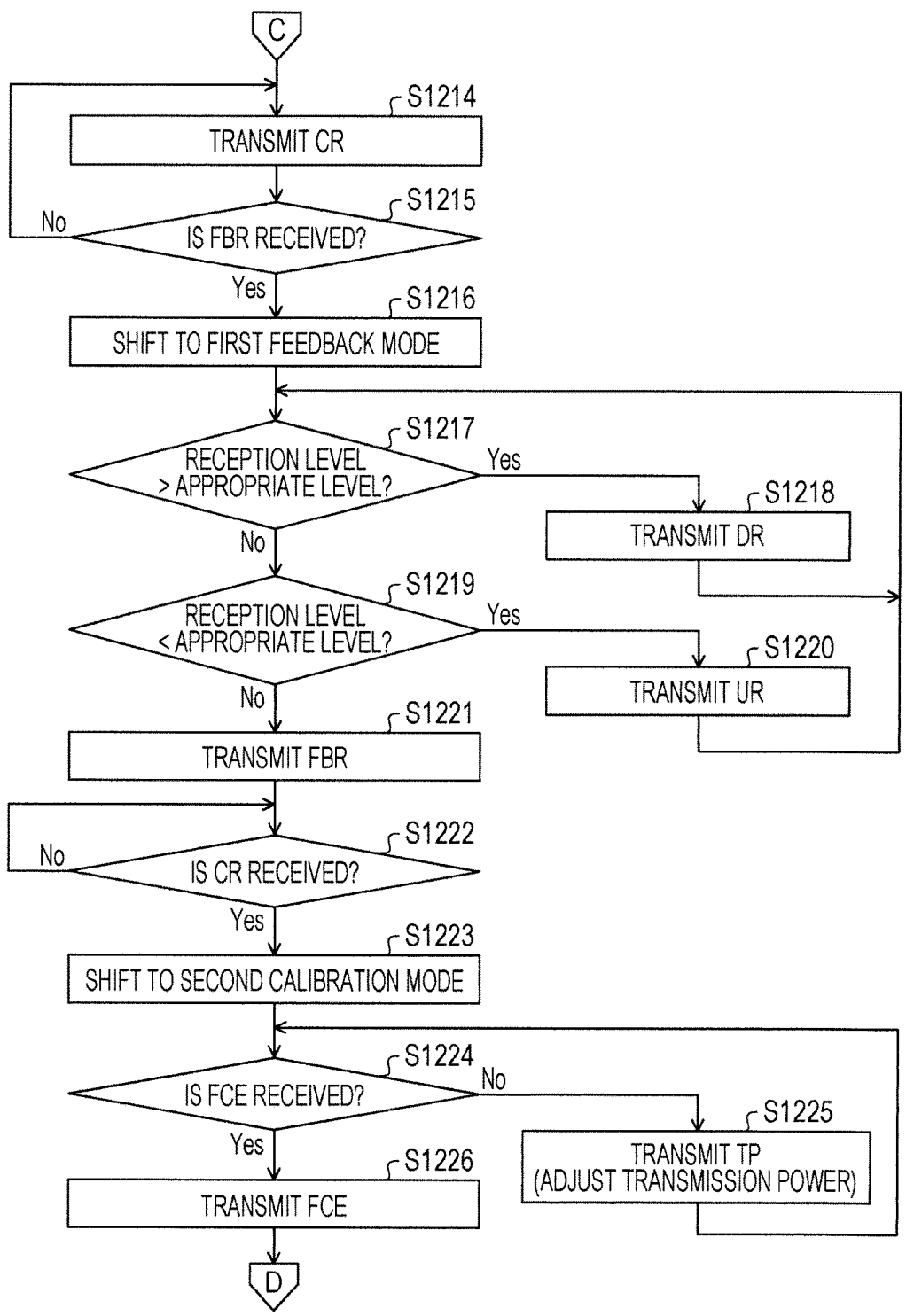
FIG. 13 is a flowchart (Part 2) illustrating another example of processing by the optical communication module according to the embodiment.

FIGS. 12 and 13 are flowcharts illustrating another example of processing by the optical communication module according to the embodiment. The processing by the first optical communication module 110 will be described, but processing by the second optical communication module 120 is similar. For example, the first optical communication module 110 may execute respective steps illustrated in FIG. 12 and FIG. 13 by being powered up to the own module. First, the first optical communication module 110 is activated in the standby mode 201 (step S1201).

Next, the first optical communication module 110 determines whether or not a CR is received from the opposing module (for example, the second optical communication module 120) within a predetermined period of time from when it becomes ready to receive a signal after being activated (Step S1202). In the case where the CR is received (step S1202: Yes), it can be determined that the opposing module is activated prior to the own module. In this case, the first optical communication module 110 shifts to the first calibration mode 203 (step S1203).

Steps S1204 to S1212 illustrated in FIG. 12 are the same as steps S818 to S826 illustrated in FIG. 9. After step S1212, the first optical communication module 110 shifts to the operation mode 206 (step S1213), and ends the series of processing. Thus, the first optical communication module 110 starts transmitting and receiving a user packet to and from the opposing module. In addition, the first optical communication module 110 transmits the user packet by the transmission power of the TP to the opposing module at the time of receiving the FBR at step S1204 in the started transmission and reception of the user packet.

In the case where it is determined in step S1202 that a CR is not received (step S1202: No), it can be determined that the own module is activated prior to the opposing module. In this case, the first optical communication module 110 transmits the CR to the opposing module (step S1214).

Next, the first optical communication module 110 determines whether or not the FBR is received from the opposing module (step S1215). In the case where the FBR is not received (step S1215: No loop), it can be determined that the opposing module is not activated yet. In this case, the first optical communication module 110 returns to step S1214. In the case where the FBR is received (step S1215: Yes), it can be determined that the opposing module is activated. In this case, the first optical communication module 110 shifts to the first feedback mode 202 (step S1216).

Steps S1217 to S1226 illustrated in FIG. 12 are the same as steps S804 to S813 illustrated in FIG. 8. After step S1226, the first optical communication module 110 proceeds to step S1213 and shifts to the operation mode 206 to end the series of processing. Thus, the first optical communication module 110 starts transmitting and receiving a user packet to and from the opposing module. In addition, the first optical communication module 110 transmits the user packet by the transmission power of the TP to the opposing module at the time of receiving the FCE at step S1224 in the started transmission and reception of the user packet.

As described above, the optical communication module of the embodiment, a first signal is transmitted to the opposing module at the time of activation of the own module, executes a first control in the case where a second signal transmitted in response to the first signal is received from the opposing module, and executes a second control after the first control.

Further, one of the first control and the second control is control of adjusting the transmission intensity of the optical signal from the own module to the opposing module, based on the feedback signal from the opposing module to the own module in response to the optical signal from the own module to the opposing module. That is, one of the first control and the second control is the calibration of the own module.

The other one of the first control and the second control is a control causing the another optical communication module to adjust the transmission intensity of the optical signal from the opposing module to the own module by transmitting a feedback signal from the own module to the opposing module in response to the optical signal from the opposing module to the own module. That is, the other of the first control and the second control is the calibration of the opposing module.

Thus, calibration of each optical communication module can be performed in the order according to the order in which each optical communication module is activated without using the central management device for calibration of each optical communication module. Thereby, it is possible to perform the calibration of the optical communication module autonomously to each other between the optical communication modules.

For example, in the example illustrated in FIGS. 8 and 9, the first signal is FBR, and in the example illustrated in FIGS. 12 and 13, it is CR. For example, in the example illustrated in FIGS. 8 and 9, the second signal is CR, and in the example illustrated in FIGS. 12 and 13, it is FBR. The feedback signal is, for example, the above-mentioned DR or UR, or FBR, FCE or the like transmitted when the reception level has reached an appropriate level.

For example, the optical communication module according to the embodiment transmits the first signal to the opposing module in the case where the first signal is not received from the opposing module at the time of activation of the own module (for example, immediately after activation). Then, when receiving the second signal transmitted in response to the first signal from the opposing module, the optical communication module performs a first control with the opposing module, and performs a second control with the opposing module after the first control.

Further, the optical communication module according to the embodiment transmits a second signal instead of the first signal to the opposing module, in the case where the first signal is received from the opposing module at the time of activation of the own module. Then, after transmitting the second signal, the optical communication module performs the second control with the opposing module and performs the first control with the opposing module after the second control.

In addition, the optical communication module according to the embodiment may be configured to wait for a random time, in the case where the first signal is transmitted to the opposing module and the first signal is received from the opposing module at the time of activation of the own module. In this configuration, in the case where the first signal is not received from the opposing module in the waiting time, the optical communication module transmits the first signal to the opposing module. Then, in the case where the second signal transmitted in response to the first signal is received from the opposing module, the optical communication module performs first control, and performs a second control after the first control.

In addition, in the case where the first signal is received from the opposing module in the random waiting time, the optical communication module transmits the second signal to the opposing module, executes the second control after transmitting the second signal, and executes the first control after the second control. Thereby, even if both of the optical communication modules transmit the first signal, each optical communication module re-transmits the first signal after a random time, and it is possible to perform calibration of each optical communication module in the order according to the order in which the first signal is transmitted. Therefore, it is possible to perform the calibration of the optical communication module autonomously to each other between the optical communication modules.

In the above-described embodiment, the configuration is described in which the transmission power in the optical communication module on the transmission side is adjusted so that the reception level in the optical communication module on the receiving side of the calibration is at the appropriate level. However, embodiments are not limited to the configuration. For example, the transmission power of the optical communication module on the transmission side may be adjusted such that the error rate or the like of the optical communication module on the receiving side in the calibration fall within the appropriate ranges.

As described above, according to the optical communication module, the parallel processing apparatus, and the adjusting method, it is possible to autonomously perform the calibration of the optical communication module mutually between the optical communication modules.

For example, optical transmission is used for communication between arithmetic circuits in a large-scale parallel processing apparatus such as a super computer. For optical transmission, an optical communication module configured to transmit and receive optical signals is used. In the optical communication module, there is a strong correlation between the light reception intensity and the transmission error rate, and as the received light intensity is stronger, the error rate tends to be lower. Therefore, a sufficient light reception intensity is to be secured for high reliability of transmission quality.

On the other hand, low power is consumed for a large-scale parallel processing apparatus. For example, in a super computer or the like realizing high speed by large-scaled parallelization of arithmetic circuits, a small power reduction per each unit leads to a large reduction in power as a whole system. Therefore, the power consumption in the optical communication module is to be reduced, and for that purpose, the light intensity is to be reduced.

Further, since the number of optical communication modules is large in a large-scale parallel processing apparatus such as a super computer, it is not realistic to manually adjust the light intensity of all optical paths to an optimum value. Therefore, in order to automatically adjust the light output intensity, a feedback signal for increasing and decreasing the light output intensity is to be transmitted from the module on the opposite side on the optical path.

At this time, in order for the module on the opposite side to receive a test pattern and transmit the feedback signal, both lanes on the receiving side and the transmitting side are used, so that the light intensities of the optical communication modules on both sides on the optical path may not be adjusted at the same time. Therefore, the order of a module transmitting a test pattern and a module executing a calibration is to be determined.

For example, a configuration is conceivable in which an instruction is issued from a central management device to optical communication modules on both sides of each transmission line so as to manage the sequence of a module transmitting a test pattern and a module executing calibration. However, since the number of transmission lines to be managed in the large-scale parallel computing device is large, there is a problem that the load of the central management device increases. Thus, a mechanism capable of performing calibration is to be obtained even without the central management device.

On the other hand, according to the above-described embodiment, a feedback and calibration sequence is performed in which the light reception intensity on the receiving side is fed back to the transmission side so as to adjust the light output intensity. In the feedback and calibration sequence, the first optical communication module activated earlier waits for activation of the second optical communication module.

After the activation of the second optical communication module, the first optical communication module transmits a signal for confirming the reception intensity to the second optical communication module, and repeats a process of receiving a response indicating the light reception intensity. If a predetermined intensity is obtained, the first optical communication module stops transmitting the signal, and the second optical communication module starts signal transmission. When a signal is received from the second optical communication module and a predetermined intensity is obtained with the same procedure, the first optical communication module ends the feedback and calibration sequence. This makes it possible, for example, to adjust the light output intensity of each optical path to the minimum intensity, without going through the central management device.

With respect to above-described each embodiment, the following notes are further disclosed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical communication module comprising:
    an optical transceiver configured to communicate with another optical communication module, and including a module including a photodetector and a laser diode; and
    a processor configured to transmit a first signal to an optical transceiver of the another optical communication module at activation of the module including the photodetector and the laser diode, execute a first control in a case where a second signal transmitted in response to the first signal is received from the another optical communication module, and execute a second control after the first control,
    wherein one of the first control and the second control is a control to adjust a transmission intensity of an optical signal from the optical transceiver of the optical communication module to the another optical communication module based on a feedback signal from the another optical communication module in response to an optical signal from the optical transceiver of the optical communication module, and
    wherein the other one of the first control and the second control is a control causing the another optical communication module to adjust a transmission intensity of an optical signal from the another optical communication module to the optical transceiver of the optical communication module by transmitting a feedback signal to the another optical communication module in response to an optical signal from the another optical communication module.

2. The optical communication module according to claim 1, wherein the processor
    transmits the first signal to the another optical communication module in a case where the first signal is not received from the another optical communication module at the time of activation of the module including the photodetector and the laser diode, executes the first control in a case where a second signal transmitted in response to the first signal is received from the another optical communication module, and executes the second control after the first control, and
    transmits the second signal to the another optical communication module in a case where the first signal is received from the another optical transmission module at the time of activation of the module including the photodetector and laser diode, executes the second control after transmitting the second signal, and executes the first control after the second control.

3. The optical communication module according to claim 1, wherein the processor
    waits for a random time in a case where the first signal is transmitted to the another optical communication module and the first signal is received from the another optical transmission module at the time of activation of the module including the photodetector and laser diode,
    transmits the first signal to the another optical communication module in a case where the first signal is not received from the another optical communication module in the random waiting time, executes the first control in a case where the second signal transmitted in response to the first signal is received from the another optical communication module, and executes the second control after the first control, and
    transmits the second signal to the another optical communication module in a case where the first signal is received from the another optical communication module in the random waiting time, executes the second control after transmitting the second signal, and executes the first control after the second control.

4. A parallel processing apparatus comprising:
    a first optical communication module and a second optical communication module capable of executing optical communication with each other, each of the first optical communication module and the second optical communication module including
        a processor, and
        an optical transceiver including a module including a photodetector and a laser diode; and
    a plurality of arithmetic circuits configured to execute parallel processing by communicating with each other using optical communication between the first optical communication module and the second optical communication module,
    wherein the processor of each one of the first optical communication module and the second optical communication module is configured to
        transmit a first signal from the one of the first optical communication module and the second optical communication module to the other of the first optical communication module and the second optical communication module at a time of activation of the module included in the transceiver of the one of the first optical communication module and the second optical communication module,
        execute a first control in a case where a second signal transmitted in response to the first signal is received from the other of the first optical communication module and the second optical communication module, and
        execute a second control after the first control,
    wherein one of the first control and the second control is a control to adjust a transmission intensity of an optical signal from the module included in the transceiver of the one of the first optical communication module and the second optical communication module to the other of the first optical communication module and the second optical communication module based on a feedback signal from the other of the first optical communication module and the second optical communication module in response to an optical signal from the module included in the transceiver of the one of the first optical communication module and the second optical communication module, and
    wherein the other one of the first control and the second control is a control causing the other of the first optical communication module and the second optical communication module to adjust a transmission intensity of an optical signal from the other of the first optical communication module and the second optical communication module to the module included in the transceiver of the one of the first optical communication module and the second optical communication module by transmitting a feedback signal to the other of the first optical communication module and the second optical communication module in response to an optical signal from the other of the first optical communication module and the second optical communication module.

5. An adjusting method by an optical communication module capable of optical communication with another optical communication module, the method comprising:
    transmitting, by a processor of the optical communication module, a first signal to the another optical communication module at the time of activation of a module including a photodetector and a laser diode of a transceiver of the optical communication module;

executing, by the processor, a first control in a case where a second signal transmitted in response to the first signal is received from the another optical communication module; and executing, by the processor, a second control after the first control, wherein one of the first control and the second control is a control to adjust a transmission intensity of an optical signal from the module included in the transceiver of the optical communication module to the another optical communication module based on a feedback signal from the another optical communication module in response to an optical signal from the module included in the transceiver of the optical communication module, and wherein the other one of the first control and the second control is a control causing the another optical communication module to adjust a transmission intensity of an optical signal from the another optical communication module to the module included in the transceiver of the optical communication module by transmitting a feedback signal to the another optical communication module in response to an optical signal from the another optical communication module.

* * * * *